United States Patent [19]
Fork

[11] 3,903,666
[45] Sept. 9, 1975

[54] ACCESS ARRANGEMENT FOR AN ELECTRICAL WIRING DISTRIBUTING FLOOR STRUCTURE

[75] Inventor: Frank W. Fork, Allison Park, Pa.

[73] Assignee: H. H. Robertson Company, Pittsburgh, Pa.

[22] Filed: Oct. 21, 1974

[21] Appl. No.: 516,669

[52] U.S. Cl. .................................. 52/221; 174/49
[51] Int. Cl.² ..................... H02G 3/04; E04F 19/08
[58] Field of Search ........ 52/173, 220, 221; 174/48, 174/49

[56] References Cited
UNITED STATES PATENTS

| | | | |
|---|---|---|---|
| 3,417,191 | 12/1968 | Fork | 52/221 X |
| 3,459,875 | 8/1969 | Fork | 52/221 X |
| 3,592,956 | 7/1971 | Fork | 174/49 |
| 3,715,455 | 2/1973 | Casto | 174/48 |
| 3,721,051 | 3/1973 | Fork | 52/173 |

*Primary Examiner*—J. Karl Bell
*Attorney, Agent, or Firm*—Harry B. Keck; George E. Manias

[57] ABSTRACT

A metal cellular flooring unit presenting generally parallel enclosed cells separated by troughs, and having a cell or compartment forming unit extending transversely of the cells. Novel enclosure means is provided for establishing isolated wiring access between the cell forming unit and a particular cell of the flooring unit without penetrating the crest of the particular cell.

A metal subfloor is provided comprising metal cellular flooring units intermixed with non-cellular flooring units. A bottomless electrical cable trench-forming sub-assembly is applied over the metal subfloor to enclose the cell or compartment forming unit and the present enclosure means. One or both webs of one or all other cells of selected metal cellular flooring units are provided with a web access opening establishing communication between the other cells and the interior of the trench-forming sub-assembly. Pre-set insert assemblies of the type utilizing web access openings in the cellular flooring units are installed on the subfloor at selected spaced-apart locations remote from the trench-forming sub-assembly. The overall arrangement is such that the expected structural strength of the crests presented by the cellular and the non-cellular flooring units is undiminished by access openings.

14 Claims, 18 Drawing Figures

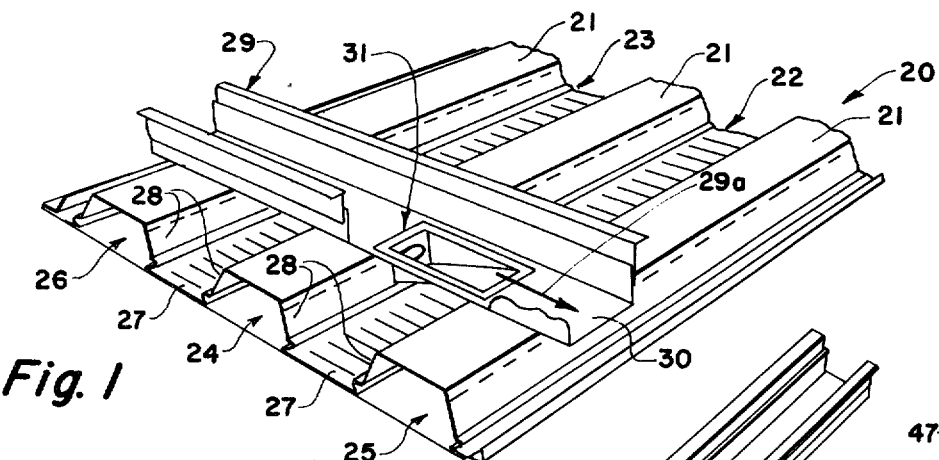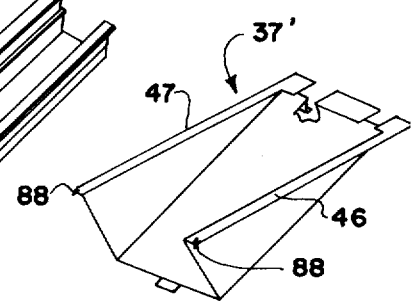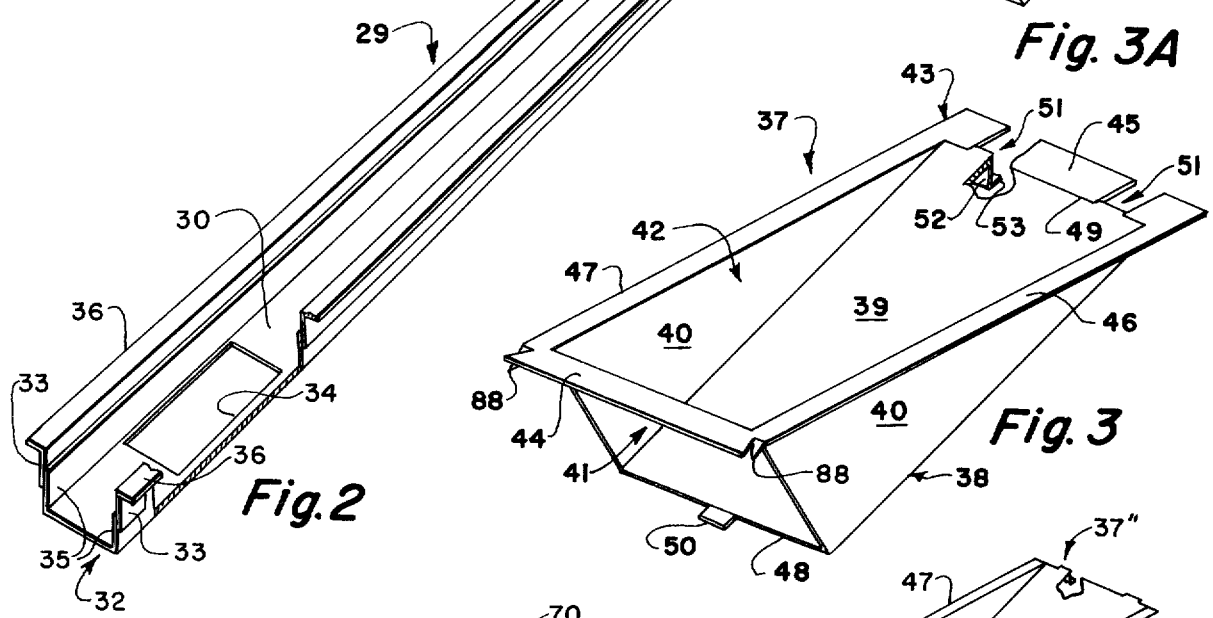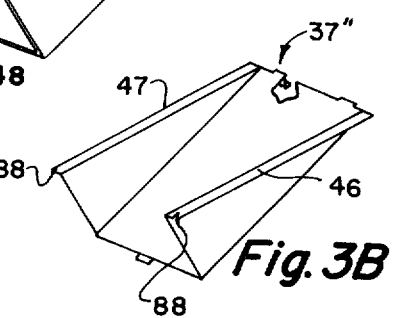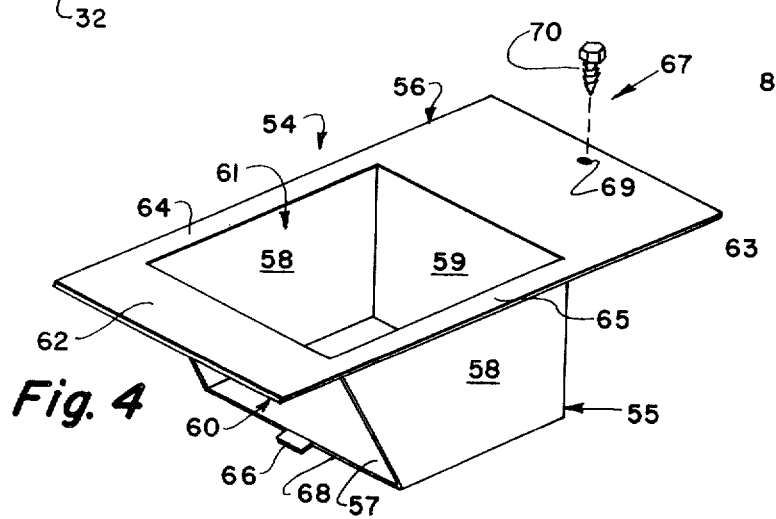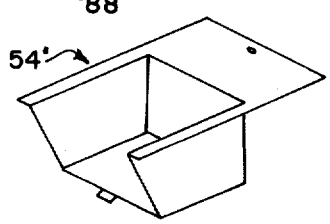

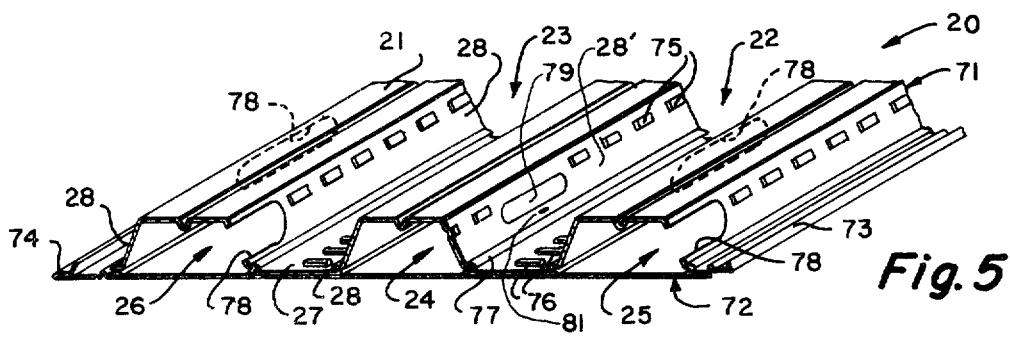
Fig. 5
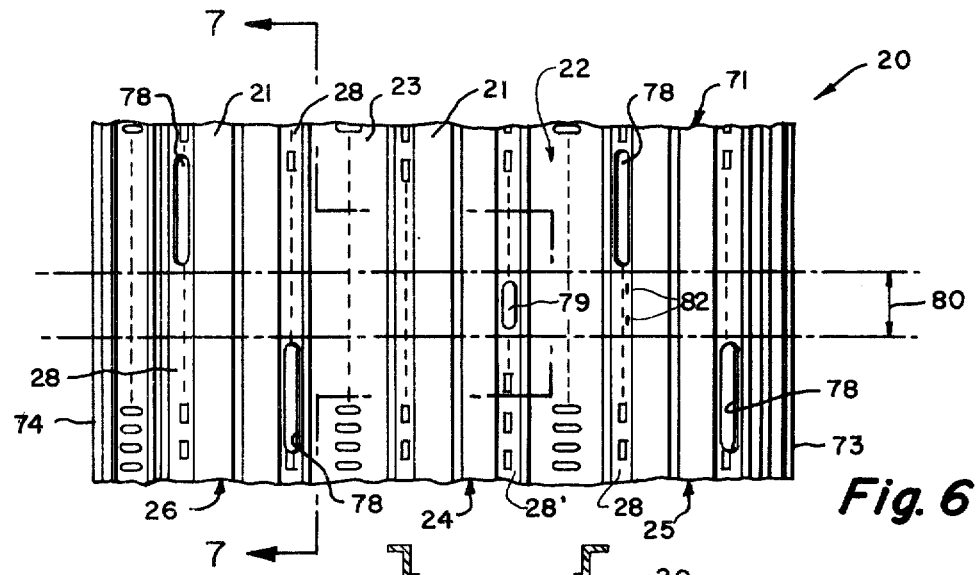
Fig. 6
Fig. 7
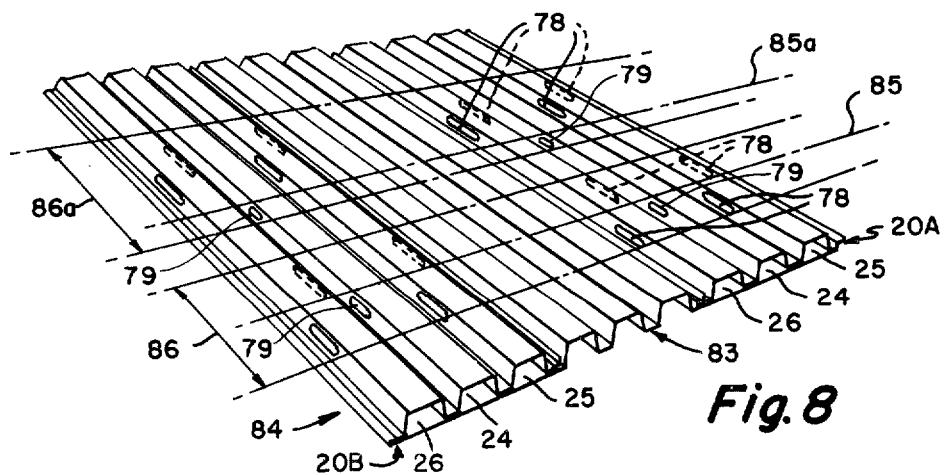
Fig. 8

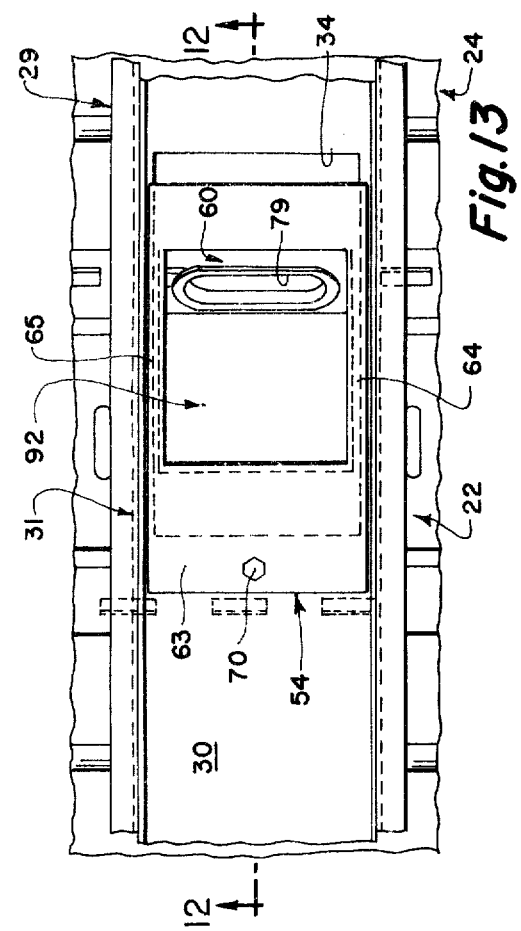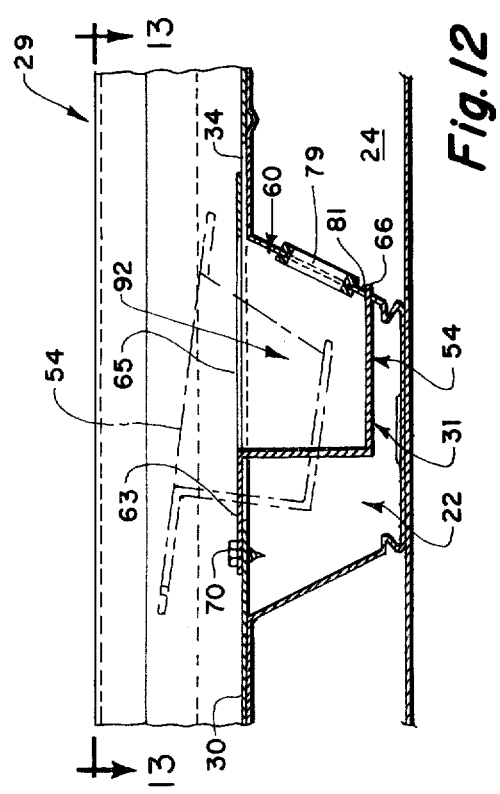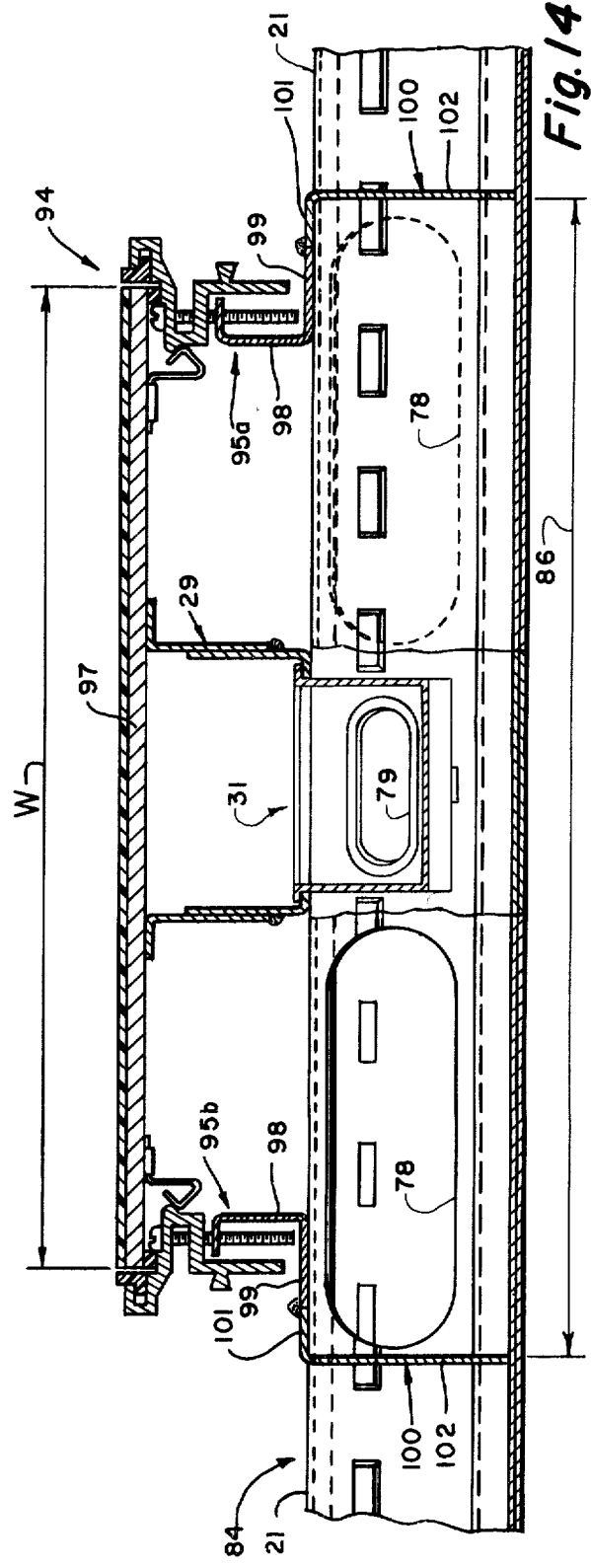

ACCESS ARRANGEMENT FOR AN ELECTRICAL WIRING DISTRIBUTING FLOOR STRUCTURE

BACKGROUND OF THE INVENTION

1. Field of the Invention

This invention relates to an electrical wiring distributing floor structure, and more particularly to metal cellular flooring and cell forming units useful in combination with a bottomless trench-forming sub-assembly for the distribution of electrical wiring.

2. Description of the Prior Art

The prior art includes many examples of metal cellular flooring units having plural access openings arranged to provide communication between the flooring unit cells and the space above the flooring unit. The access openings have been provided in the crests of the flooring unit, see U.S. Pat. Nos. 2,073,490 (LEWIN, March 1937); 3,303,264 (SAUL et al, February 1967); 3,453,791 (FORK, July 1969); 3,592,956 (FORK, July 1971); 3,609,210 (GURITZ, September 1971); 3,676,568 (FORK, July 1972); 3,701,837 (FORK, October 1972). The access openings of the above-cited prior art flooring units are adapted for use in combination with dual outlet fittings, each presenting one or more outlet openings at the floor level through which communication is established to the interiors of the adjacent cells.

Access openings also have been provided in opposed pairs in the opposed webs of the adjacent flooring unit cells, see U.S. Pat. Nos. 3,426,492 (FORK, February 1969); 3,426,802 (FORK, February 1969); 3,459,875 (FORK, August 1969). The opposed access openings in the FORK '492, '802, and '875 patents are particularly adapted to receive the dual outlet fitting of U.S. Pat. No. 3,417,191 (FORK, December 1968).

Underfloor electrical cable trench headers are known which incorporate a base pan having a horizontal web. Superposed access openings formed in the horizontal web of the base pan and the crests of the subadjacent cells provide access to the wiring in the subfloor cells. See, for example, U.S. Pat. Nos. 3,074,208 (SEIDEL, January 1963); 3,237,356 (FORK, March 1966); 3,262,238 (FORK, July 1966); 3,368,311 (FORK, February 1968).

A recent development in the trench header art — identified as a bottomless trench-forming sub-assembly — utilizes an upper surface portion of the subfloor as a bottom. Access openings in the crests of the subfloor cells provide access to the wiring for distribution. See U.S. Pat. No. 3,721,051 (FORK, March 1973).

SUMMARY OF THE INVENTION

The principal object of this invention is to provide an electrical wiring distributing floor structure wherein the expected structural strength of the cell crests which serve as compression and tension flanges is undiminished by access openings.

Another object of this invention is to provide a novel access arrangement which establishes isolated wiring access between a particular cell of a flooring unit and a cell or compartment forming unit extending transversely of the flooring unit cells — the isolated wiring access being established without penetrating the crest of the particular cell.

A further object of this invention is to provide an underfloor electrical cable trench arrangement including a compartment forming unit therein, having a novel access opening arrangement which establishes communication between the interior of the trench and that of the cells solely through the webs of the cells.

The present invention provides improvements in an electrical wiring distributing floor structure of the type including a metal cellular flooring unit and a cell forming unit extending transversely thereof. The metal cellular flooring unit presents alternating crests and troughs and provides generally parallel enclosed cells. Each trough includes confronting webs, one provided by each of adjacent cells, and a common valley. The cell forming unit extends transversely across the enclosed cells and has a bottom wall confronting the crest.

In the present arrangement, the bottom wall of the cell forming unit is provided with a wall opening positioned above one trough presented between adjacent first and second cells. A web access opening is provided in that web of the first cell which is presented within the one trough. Enclosure means is provided for isolating a trough portion of the one trough — the trough portion including the web access opening and at least a portion of the wall opening. The enclosure means establishes communication between the interior of the first cell and that of the cell forming unit.

According to one embodiment of the present invention, fastening means is provided for securing the enclosure means and the cell forming unit to the flooring unit.

In accordance with an alternative embodiment of the present invention, fastening means is provided for securing the enclosure means to the cell forming unit.

The present invention finds particular utility in combination with the bottomless electrical cable trench-forming sub-assembly described and claimed in U.S. Pat. No. 3,721,051, supra. In this instance, an electrical wiring distributing floor structure is provided having a metal subfloor presenting alternating crests and troughs and including metal cellular flooring units providing generally parallel enclosed cells. The bottomless trench-forming sub-assembly extends transversely across the crests of the cells and cooperates with an upper surface portion of the metal subfloor to create an underfloor electrical cable trench. The sub-assembly includes spaced-apart opposite sides and a cover plate spanning the distance between the opposite sides. The cell or compartment forming unit extends downwardly from the cover plate between the opposite sides of the sub-assembly. The bottom wall of the cell or compartment forming unit is provided with a wall opening positioned above one trough of one metal cellular flooring unit. A web access opening is provided in that web of a first cell presented within the one trough. The present enclosure means is provided for isolating a trough portion of the one trough thereby to establish communication between the interior of the first cell and the cell or compartment forming unit. One or both of the webs of one or all other cells of the one metal cellular flooring unit may be provided with web access openings which establish communication between the interior of the other cells and the interior of the sub-assembly other than the interior of the compartment forming unit.

BRIEF DESCRIPTION OF THE DRAWINGS

FIG. 1 is an isometric view illustrating a cell or compartment forming unit installed over a metal cellular flooring unit and incorporating enclosure means of this invention;

FIG. 2 is a perspective view illustrating the cell or compartment forming member;

FIG. 3 is an isometric view, partly in cross-section, illustrating the present enclosure means;

FIGS. 3A and 3B are views, similar to FIG. 3, illustrating alternative embodiments of the enclosure means of FIG. 3;

FIG. 4 is an isometric view illustrating an alternative embodiment of the present enclosure means;

FIG. 4A is a view, similar to FIG. 4, illustrating an alternative embodiment of the enclosure means of FIG. 4;

FIG. 5 is a fragmentary isometric view illustrating a metal cellular flooring unit;

FIG. 6 is a fragmentary plan view of the metal cellular flooring unit of FIG. 5;

FIG. 7 is a cross-sectional view taken along the line 7—7 of FIG. 6;

FIG. 8 is a fragmentary perspective view of a metal subfloor incorporating the metal cellular flooring unit of FIG. 5;

FIG. 12 is a cross-sectional view, taken along the line 12—12 of FIG. 13, illustrating the enclosure means of FIG. 4 in an installed position;

FIG. 13 is a cross-sectional view taken along the line 13—13 of FIG. 12;

FIG. 14 is a fragmentary cross-sectional view taken along the line 14—14 of FIG. 15.

BRIEF DESCRIPTION OF THE PREFERRED EMBODIMENTS

Figure 9:
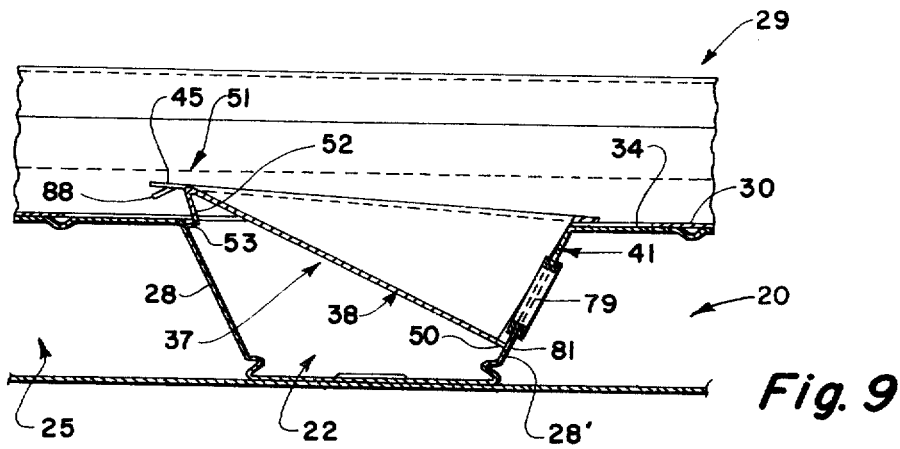
FIG. 9 is a fragmentary cross-sectional view, taken substantially along the line 9—9 of FIG. 11, illustrating the installation of the enclosure means of FIG. 3.

FIG. 1 illustrates a metal cellular flooring unit 20 presenting alternating crests 21 and troughs 22, 23 and providing generally parallel enclosed cells, e.g., a central cell 24 and two lateral cells 25, 26. Each trough 22, 23 includes a valley 27 and confronting webs 28. A cell or compartment forming unit 29 extends transversely across the enclosed cells 24 to 26 and has a bottom wall 30 confronting the crests 21. In accordance with the present invention, enclosure means 31 is provided which isolates a trough portion of the trough 22 thereby to establish communication between the interior of the cell 24 and the cell or compartment forming unit 29.

The compartment forming unit 29 (FIG. 2) may comprise a U-shaped channel 32 including vertically adjustable side plates 33. The U-shaped channel 32 includes the bottom wall 30 having longitudinally spaced-apart wall openings 34, and upstanding side walls 35. Each of the side plates 33 presents support flanges 36 along its upper longitudinal edge.

The enclosure means 31 may comprise an access unit, alternative embodiments of which are illustrated in FIGS. 3, 3A, 3B; and in FIGS. 4, 4A.

The access unit 37 (FIG. 3) comprises a body 38 having an inclined base 39, opposite sides 40, an open end 41, an open top 42, and a peripheral flange 43 including opposite transverse end flanges 44, 45 and opposite lateral flanges 46, 47. Alternatively, the transverse end flange 44 may be omitted in which case an access unit 37' (FIG. 3A) is provided. As a further alternative, both of the opposite transverse end flanges 44, 45 may be omitted in which case an access unit 37'' (FIG. 3B) is provided.

One or more tangs 88 may be formed in the peripheral flange 43 to provide electrical grounding of the access unit 37 when installed. The tangs 88 may be formed in the transverse end flange 44 of the access unit 37 (FIG. 3) or in the opposite lateral flanges 46, 47 of the access units 37' and 37'' (FIGS. 3A, 3B).

It will be observed in FIG. 3 that the inclined base 39 has one end 48 constituting the bottom edge of the open end 41 and an opposite end 49 which terminates in the transverse end flange 45. The inclination of the base 39 facilitates "fishing" of electrical cables through the cell or compartment forming unit 29, in the direction of the arrow 29a (FIG. 1).

As will be described, the access unit 37 is adapted to be introduced into one of the wall openings 34 (FIG. 2) of the cell or compartment forming unit 29.

A tab 50 and fastening means 51 presented at the opposite ends 48, 49, respectively, of the inclined base 39 serve to secure the access unit 37 to the flooring unit 20 (FIG. 1). In this embodiment, the fastening means 51 comprises a tongue 52 extending downwardly below the inclined base 39 and terminating in a flange 53 extending outwardly thereof generally parallel with the transverse end flange 45. The fastening means 51 is arranged such that the tongue 52 will be deflected toward the inclined base 39 until the flange 53 snaps into a cooperating slot formed in the flooring unit 20.

The access unit 54 (FIG. 4) comprises a body 55 having a base 57, opposite side walls 58, an end wall 59, and a peripheral flange 56. The body 55 presents an open end 60 and an open top 61. The peripheral flange 56 comprises opposite transverse end flanges 62, 63 and opposite lateral flanges 64, 65. Alternatively, the transverse end flange 62 may be omitted in which case an access unit 54' of the type illustrated in FIG. 4A is provided.

The access unit 54 (FIG. 4) includes a tab 66 and fastening means 67 which cooperate to secure the access unit 54 in position. The tab 66 extends from that edge 68 of the base 57 which is presented at the open end 60. The fastening means 67 comprises an aperture 69 provided in the transverse end flange 63, and a fastener 70, such as a self tapping sheet metal screw.

Referring to FIGS. 5 and 6, the metal cellular flooring unit 20 may comprise a corrugated upper metal sheet 71 and a correlative lower metal sheet 72 secured to the upper metal sheet 71 along contiguous portions thereof. The flooring unit 20 additionally presents marginal connecting means 73, 74 along the opposite longitudinal edges thereof adapting the flooring unit 20 for interconnection with other units.

It will be observed in FIG. 5 that each of the cells 24, 25, 26 is defined by a crest 21, two inclined webs 28 depending from the opposite sides of the crest 21 and that portion of the lower metal sheet 72 extending between the inclined webs 28. The three-cell unit 20 is employed conveniently for distributing different electrical services. For example, the central cell 24 is employed to distribute high voltage power wiring, whereas the lateral cells 25, 26 are employed to distribute low voltage telephone wiring and special services wiring.

It will further be observed in FIG. 5 that the metal cellular flooring unit 20 may be provided with composite features, such as web deformations 75, valley deformations 76, and longitudinal ribs 77 — the composite features adapting the flooring unit 24 composite coaction with an overlying layer of concrete. It will also be observed in FIG. 5 that the width of the crests 21 is substantially equal to that of the valleys 27. The inclination of the webs 28 is such that the troughs 22, 23 have a relatively wide configuration.

Referring to FIGS. 5 through 7, one or both of the webs 28 of one or both of the lateral cells 25, 26 may be provided with a web access opening 78 which establishes communication between the interiors of the lateral cells 25, 26 and the space above the flooring unit 20. In accordance with the present invention, one of the inclined webs, for example, the web 28' of the central cell 24 is provided with a web access opening 79 which establishes communication between the interior of the central cell 24 and, as best illustrated in FIG. 7, the interior of the cell or compartment forming unit 29 through the bottom wall opening 34 thereof. It will be observed that the web access openings 78 of each of the lateral cells 25, 26 reside on opposite sides of the web access opening 79. The staggered or laterally offset relation of the web access openings 78 with respect to the web access openings 79 provides a transverse region 80 (FIG. 6) of the flooring unit 20 which contains only the web access opening 79. As will hereinafter be more fully explained, the transverse region 80 corresponds to the width of the cell or compartment forming unit 29. It should be noted that the web access openings 78, 79 preferably have an elongated configuration including semicircular end portions thereby to facilitate insertion and withdrawal of electrical wiring.

A slot 81 (FIGS. 5 and 7) is provided in the inclined web 28' of the central cell 24 at a level below the web access opening 79. The slot 81 is positioned to receive the tab 50 or 66 of the access units 37, 54, respectively. The web 28 (FIG. 6) of the lateral cell 25 which confronts the inclined web 28' is provided with spaced slots 82. The slots 82 are positioned to receive the flanges 53 of the fastening means 51 provided on the access unit 37 (FIG. 3).

The metal cellular flooring units, such as the units 20A, 20B (FIG. 8) may be intermixed with non-cellular flooring units 83 (only one illustrated) to provide a metal subfloor 84. Two web access opening patterns are illustrated in FIG. 8. In the first pattern, the web access openings 79 are aligned along a center line 85 which extends perpendicular to the cells 24, 25 and 26. The web access openings 78 and 79 are presented entirely within a transverse region 86 of the metal subfloor 84. In the second pattern, the web access openings 79 are aligned along the center line 85a with the web access openings 78 all presented on one side of the center line 85a. The web access openings 78, 79 again are presented entirely within the transverse region 86a. The significance of the transverse regions 86 and 86a will become apparent later in the specification.

ACCESS UNIT INSTALLATION

Figure 10:
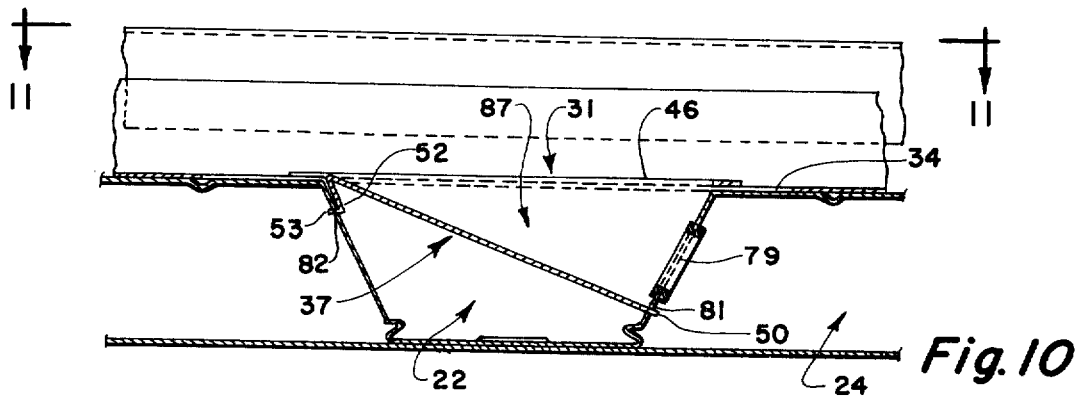
FIG. 10 is a fragmentary cross-sectional view, similar to FIG. 9, illustrating the enclosure means in an installed position.
Figure 11:
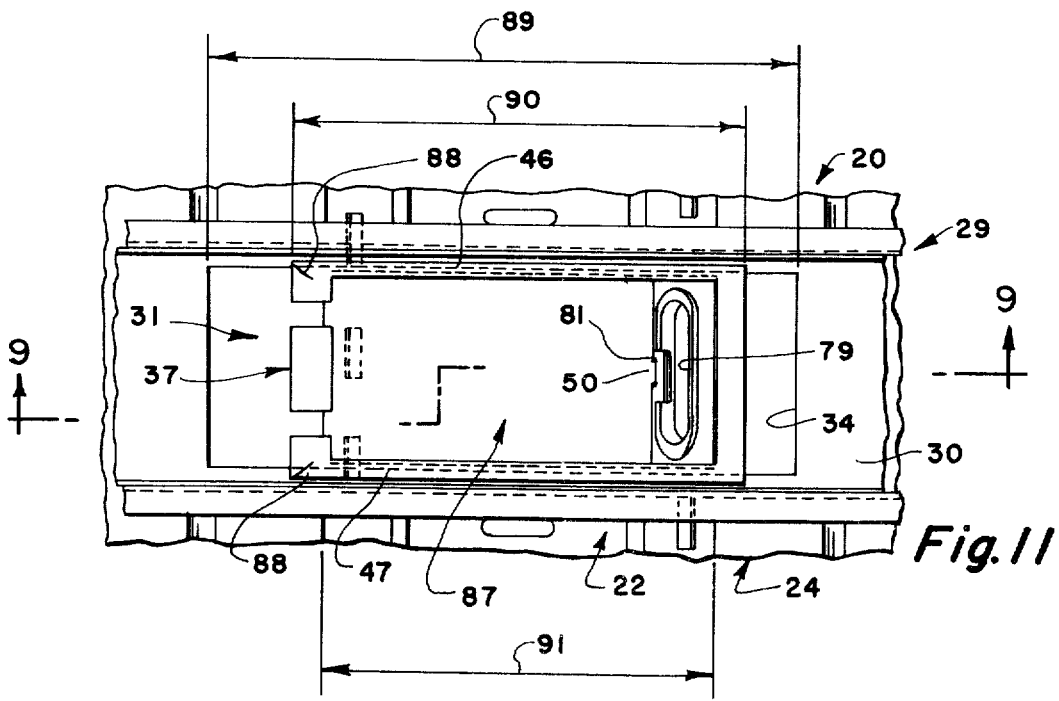
FIG. 11 is a fragmentary cross-sectional view taken along the line 11—11 of FIG. 10.

The installation of the access unit 37 is illustrated in FIGS. 9 through 11. It will be observed in FIG. 9 that the body 38 of the access unit 37 is introduced through the wall opening 34 into the trough 22 and is positioned so that the open end 41 thereof is adjacent to the web access opening 79. The tab 50 is at the entrance of the slot 81 formed in the web 28'. At the opposite end of the access unit 37, the flanges 53 (only one visible) of the fastening means 51 engage the inclined web 28 of the lateral cell 25.

The application of a downward force on the access unit 37 will cause the tongue 52 to deflect until the adjoining flange 53 thereof snaps into the slot 82, as illustrated in FIG. 10. Simultaneously, the tab 50 is introduced through the slot 81.

It will be observed in FIGS. 10 and 11 that the access unit 37 (the enclosure means 31) isolates a trough portion 87 of the trough 22. The trough portion 87 includes the web access opening 79 and at least a portion of the wall opening 34. Communication is thus established between the interior of the first or central cell 24 and that of the cell or compartment forming unit 29.

It will be observed in FIG. 11 that the longitudinal length 89 of the wall opening 34 is greater than the longitudinal length 90 of the access unit 37 and greater than the width 91 of the trough 22. As shown in FIG. 2, the longitudinally spaced-apart wall openings 34 are presented at a fixed distance from each other. The oversize longitudinal length 89 of the wall openings 34 accommodates dimensional variations in the trough width 91 and in the spacing of the troughs 22 of the spaced-apart metal cellular flooring units 20 across which the cell or compartment forming unit 29 extends.

It will be observed in FIG. 9 that the tangs 88 (only one visible) are presented below the transverse end flange 45 and are positioned to engage the bottom wall 30 of the cell or compartment forming unit 29. As the access unit 37 is forced downwardly into the trough 22, the tangs 88 bite into the bottom wall 30 thereby to provide electrical grounding of the access unit 37 to the cell or compartment forming unit 29.

It will be noted in FIG. 11 that the lateral flanges 46 overlie portions of the bottom wall 30. Thus when the access unit 37 is secured to the flooring unit through the cooperative action of the tab 50, tongue 53, and slots 81, 82 the cell or compartment forming unit 29 also is secured to the flooring unit 20.

The installation of the access unit 54 (FIG. 4) is illustrated in FIGS. 12 and 13. The access unit 54, illustrated in dash-dot outline in FIG. 12, is introduced downwardly through the wall opening 34 until the lateral flanges 64, 65 thereof engage the bottom wall 30 of the cell or compartment forming unit 29. The access unit 54 is then moved toward the access opening 79 until the tab 66 thereof is received in the slot 81 (FIG. 12). Thus positioned, the web access opening 79 is presented at the open end 60 of the access unit 54. The transverse end flange 63 is then secured to the bottom wall 30 by the fastener 70.

The access unit 54 (enclosure means 31) isolates a trough portion 92 of the trough 22, which includes the web access opening 79 and at least a portion of the wall opening 34. Communication is thus established between the interior of the first or central cell 24 and the interior of the cell or compartment forming unit 29.

Figure 15:
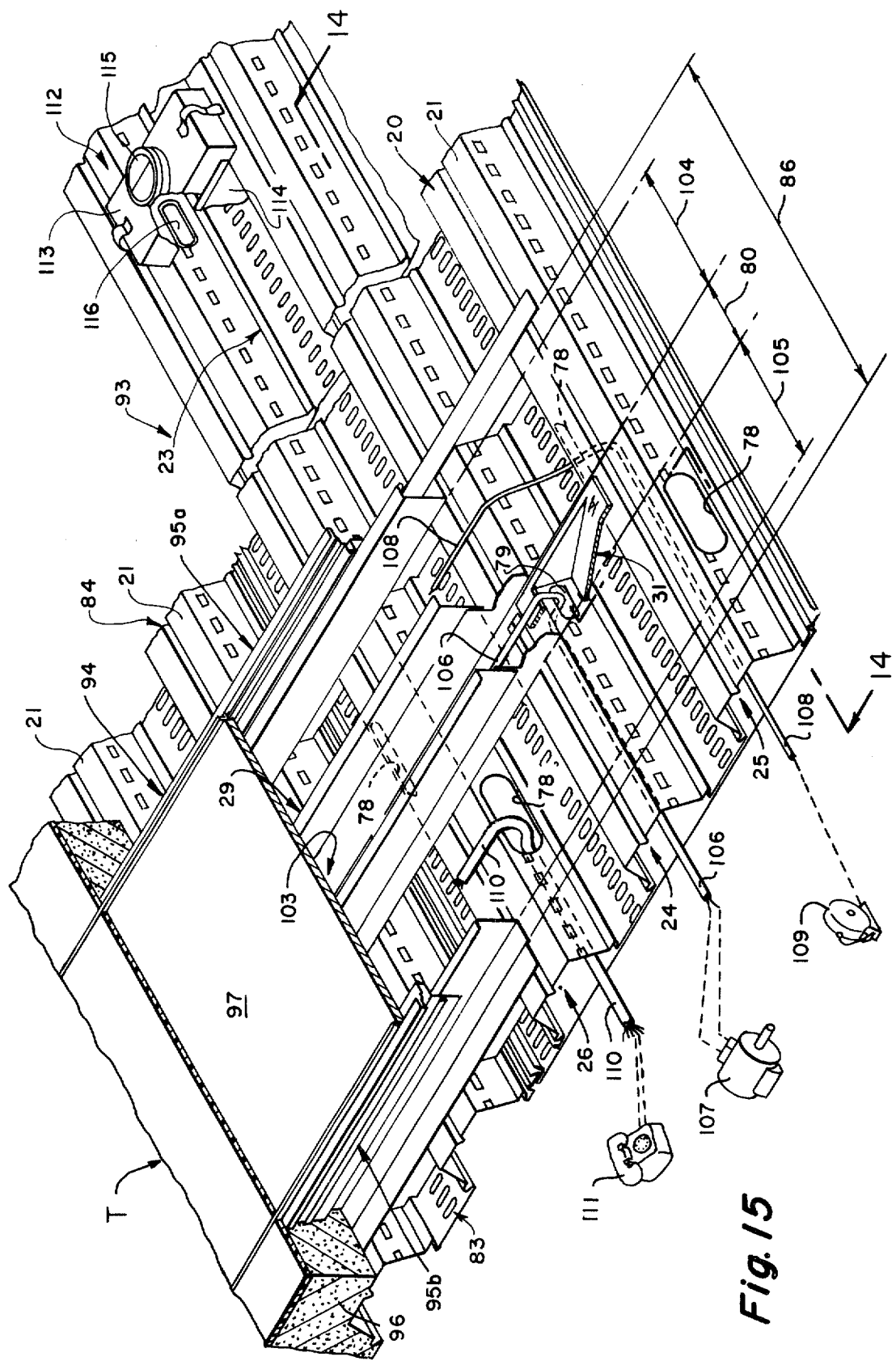
FIG. 15 is a fragmentary isometric view of a floor structure illustrating the use of the present enclosure means in combination with the metal subfloor of FIG. 8 and a bottomless electrical cable trench-forming assembly.

FIG. 15 illustrates a floor structure 93 incorporating the metal subfloor 84 and a bottomless electrical cable trench-forming sub-assembly 94. For a complete description of the trench-forming sub-assembly 94 reference is directed to U.S. Pat. No. 3,721,051, supra. Briefly, the trench-forming sub-assembly 94 includes opposite sides 95a, 95b, each independently anchored in the concrete 96 in fixed spaced-apart relationship, and a cover plate 97 spanning the distance between the opposite sub-assembly sides 95a, 95b. As best illustrated in FIG. 14, each of the sides 95a, 95b includes, in part, sub-rails 98 having lower horizontal flanges 99 overlying the crest 21 of the subfloor 84. Closure means in the form of angle members 100 which substantially entirely fill the troughs of the subfloor 84 prevent ingress of the subsequently poured concrete into the interior of the trench-forming sub-assembly 94. Each of the angle members 100 includes an upper horizontal flange 101 abutting the lower horizontal flange 99 of the sub-rail 98 and vertically presented closure elements 102.

Reverting to FIG. 15, the sub-assembly 94 extends transversely across the crest 21 of the cellular and non-cellular flooring units 20, 83 and utilizes that upper surface portion of the metal subfloor 84 which corresponds to the transverse region 86, as a bottom. The upper surface portion (transverse region 86) cooperates with the sub-assembly 94 to create an underfloor electrical cable trench T.

As can be seen in FIG. 15, the width of the compartment forming unit 29 corresponds to the transverse region 80 whereas the transverse region 86 corresponds to a width (hereinafter identified) of the trench-forming sub-assembly 94. Trench-forming sub-assemblies presently are provided in widths of from 9" up to 36". Trench-forming sub-assemblies having widths of up to 48" are presently being considered. As a standard in the industry practice, the specified trench width corresponds to the width W (FIG. 14) of the cover plate 97. However, as best illustrated in FIG. 14, the transverse region 86 has a width corresponding to the distance between the vertically presented closure elements 102 of the closure means 100. Hence the transverse region 86 corresponds to that upper surface area of the metal cellular flooring 20 which constitutes the bottom of the underfloor electrical cable trench T. As hereinabove defined, the width of the transverse region 86 exceeds the trench width W by a relatively small increment. The transverse region 86 may have a width of up to about 50".

The compartment forming unit 29 is enclosed by the sub-assembly 94 — the compartment forming unit 29 being disposed between the opposite sub-assembly sides 95a, 95b and extends downwardly from the cover plate 97. The compartment forming unit 29 provides a central passageway 103, and in addition, divides the interior of the trench-forming sub-assembly 94 into lateral passageways 104, 105. As described above, the present enclosure means 31 establishes communication between the interior of the central passageway 103 and the central cell 24 through the enclosed web access opening 79.

The central passageway 103 accommodates high voltage power conductors such as the conductor 106, which extends through the central passageway 103, downwardly through the web access opening 79 which is isolated by the present enclosure means 31, into the central cell 24 and is connected, for example, to a motor schematically illustrated at 107. The lateral passageway 104 accommodates auxiliary wiring such as the wiring 108 which extends through the lateral passageway 104, through the web access opening 78 into the lateral cell 25 and is connected, for example, to an alarm schematically illustrated at 109. The lateral passageway 105 accommodates low voltage telephone wiring, such as the telephone cable 110 which extends through the lateral passageway 105, through the web access opening 78 into the second lateral cell 26 and has a pair of its many strands connected, for example, to a telephone schematically illustrated at 111. It will be appreciated that the compartment forming unit 29 cooperates with the present enclosure means 31 to segregate the high voltage power conductor 106 from the low voltage auxiliary and telephone wiring 108, 110. Moreover, the auxiliary and telephone wiring 108, 110 are themselves essentially segregated.

IMPROVED FLOOR STRUCTURE

It is known that the crests of the cellular and non-cellular flooring units of a metal subfloor serve as compression flanges in the region between supporting horizontal beams and serve as tension flanges in the region above the supporting horizontal beams. The present invention provides an improved electrical wiring distributing floor structure wherein the expected structural strength of the flooring unit crests is undiminished by access openings.

Referring to FIG. 15, a plurality of pre-set insert assemblies, such as the insert assembly 112, may be provided at spaced-apart locations in the metal subfloor 84, which are remote from the trench T. The pre-set insert assembly 112 preferably is of the type described and claimed in copending U.S. application Ser. No. 427,507 filed Dec. 26, 1973 and assigned to the assignee of this invention. For a complete description of the insert assemblies 112, reference is directed to the aforesaid U.S. application Ser. No. 427,507. Briefly, the insert assembly 112 comprises an access housing 113 spanning across, for example, the trough 23. Trough closures 114 (only one visible) enclose a trough space which is accessible through a dual outlet opening 115 provided in the top of the access housing 113. Web access openings 116 (only one visible) establish communication between the interior of the central and lateral cells 24, 26 and the interior of the insert assembly 112.

It will be noted in the floor structure 93 that all of the web access openings 78, 79 and 116 are formed solely in the webs of the cells 24, 25 and 26 of all or selected metal cellular flooring units 20. Adequate access to the wiring distributed through the cells of the metal cellular flooring unit 20 is provided by the web access openings 78, 79 and 116. The crests 21 of the cellular as well as the non-cellular flooring units 20, 21, respectively, remain imperforate and their expected structural strength is undiminished.

I claim:

1. In an electrical wiring distributing floor structure including a metal cellular flooring unit presenting alternating crests and troughs and providing generally parallel enclosed cells, each trough including a valley and confronting webs; the improvement comprising:

a cell forming unit extending transversely across said enclosed cells and having a bottom wall confronting said crests;

said bottom wall having a wall opening presented above one trough which is disposed between adjacent first and second cells;

a web access opening in that web of the first cell which is presented within said one trough; and enclosure means for isolating a trough portion of said one trough which includes said web access opening and at least a portion of said wall opening, thereby to establish communication between the interior of the first cell and that of said cell forming unit.

2. The improvement of claim 1 wherein said enclosure means includes an inclined base having one end below the level of said web access opening and an opposite end substantially at the level of the crest of the second cell.

3. The improvement of claim 1 wherein said enclosure means comprises an access unit having a body disposed in said trough portion, an open top adjacent to said wall opening, and an open end adjacent to said web access opening.

4. The improvement of claim 3 including fastening means for securing said access unit to said flooring unit.

5. The improvement of claim 4 wherein said access unit includes flanges overlying portions of said bottom wall, whereby said fastening means also secures said cell forming unit to said flooring unit.

6. The improvement of claim 4 wherein said fastening means comprises:

slots, one formed in the web of said first cell and one formed in the web of said second cell;

a tab extending from said open end of said body into the slot of said first cell; and a flanged tongue extending from the opposite end of said body into the slot of said second cell.

7. The improvement of claim 6 wherein the slot in the web of said first cell is positioned below said web access opening.

8. The improvement of claim 6 wherein the slot in the web of said second cell is positioned beneath the crest of said second cell; and wherein said flanged tongue extends downwardly from said body into said one trough.

9. The improvement of claim 3 including fastening means for securing said access unit to said cell forming unit.

10. The improvement of claim 9 wherein said access unit includes at least one transverse end flange overlying said bottom wall; and wherein said fastening means includes a fastener securing said transverse end flange to said bottom wall.

11. The improvement of claim 10 wherein said fastening means additionally includes a slot formed in the web of said first cell; and a tab extending from said open end of said body into said slot.

12. The improvement of claim 11 wherein said slot is presented beneath said web access opening.

13. In an electrical wiring distributing floor structure having a metal subfloor presenting alternating crests and troughs and including metal cellular units providing generally parallel enclosed cells, each of said troughs presenting a valley and confronting webs; a bottomless trench-forming sub-assembly extending transversely across said crests and cooperating with an upper surface portion of said metal subfloor to create an underfloor electrical cable trench, said sub-assembly including spaced-apart opposite sides and a cover plate spanning the distance between said opposite sides; and a compartment forming unit extending downwardly from said cover plate between said opposite sides and including a bottom wall confronting said crests; the improvement comprising:

said bottom wall having a wall opening above one trough of one metal cellular unit;

a web access opening in that web of a first cell presented within said one trough; and enclosure means for isolating a trough portion of said one trough, which includes said web access opening and said wall opening, thereby to establish communication between the interior of said first cell and said compartment forming unit.

14. The improvement of claim 13 wherein one web of a second cell of said one flooring unit has a second web access opening establishing communication between the interior of said second cell and the interior of said sub-assembly other than the interior of said compartment forming unit.

* * * * *